United States Patent
Hanai et al.

(10) Patent No.: US 11,320,166 B2
(45) Date of Patent: May 3, 2022

(54) AIR CONDITIONING SYSTEM AND COMMUNICATION METHOD

(71) Applicant: Mitsubishi Electric Corporation, Tokyo (JP)

(72) Inventors: Satoshi Hanai, Tokyo (JP); Masahiro Ishihara, Tokyo (JP); Hiroaki Kotake, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 88 days.

(21) Appl. No.: 16/975,239

(22) PCT Filed: Mar. 20, 2018

(86) PCT No.: PCT/JP2018/010926
§ 371 (c)(1),
(2) Date: Aug. 24, 2020

(87) PCT Pub. No.: WO2019/180800
PCT Pub. Date: Sep. 26, 2019

(65) Prior Publication Data
US 2020/0400331 A1 Dec. 24, 2020

(51) Int. Cl.
*F24F 11/54* (2018.01)
*F24F 11/49* (2018.01)
*F24F 11/58* (2018.01)

(52) U.S. Cl.
CPC .............. *F24F 11/54* (2018.01); *F24F 11/49* (2018.01); *F24F 11/58* (2018.01)

(58) Field of Classification Search
CPC . F24F 11/49; F24F 11/54; F24F 11/58; H04L 12/413; H04L 61/103;
(Continued)

(56) References Cited

U.S. PATENT DOCUMENTS

| 5,630,324 A | * | 5/1997 | Yoshida | F24F 3/065 62/175 |
| 2003/0070439 A1 | * | 4/2003 | Shim | F24F 3/065 62/175 |

(Continued)

FOREIGN PATENT DOCUMENTS

| JP | H07-55238 A | * | 3/1995 |
| JP | 2005-286872 A | | 10/2005 |

(Continued)

OTHER PUBLICATIONS

Office Action dated Jan. 12, 2021 issued in corresponding JP Patent application No. 2020-507154 (and English machine translation).

(Continued)

*Primary Examiner* — Kidest Bahta
(74) *Attorney, Agent, or Firm* — Posz Law Group, PLC

(57) ABSTRACT

An air conditioning system includes: outdoor units; indoor units each communicating with any one of the outdoor units by a first communication method; and a central control device communicating with each of the outdoor units by a second communication method and controlling the outdoor units and the indoor units. One of the outdoor units generates, by using a first address used for communication performed using the first communication method, a second address used for communication performed using a second communication method, generates a second address for one or more of the indoor units by using a first address, and obtains second addresses from another outdoor unit and the central control device. The central control device obtains, from each of the outdoor units, second addresses of the outdoor unit and each indoor unit, and controls operations of the outdoor units and the indoor units by using the second addresses obtained.

13 Claims, 10 Drawing Sheets

(58) Field of Classification Search
CPC ............. H04L 61/2007; H04L 61/2038; H04L 61/2046; H04L 61/6004; H04L 61/6009; H04L 61/6022; H04L 67/12
See application file for complete search history.

(56) References Cited

U.S. PATENT DOCUMENTS

| | | |
|---|---|---|
| 2004/0006708 A1 | 1/2004 | Mukherjee et al. |
| 2009/0145147 A1* | 6/2009 | Kojima ................. F24F 1/0003 62/157 |
| 2016/0360467 A1 | 12/2016 | Kotake et al. |
| 2018/0007611 A1 | 1/2018 | Kotake et al. |

FOREIGN PATENT DOCUMENTS

| | | |
|---|---|---|
| JP | 2008-193600 A | 8/2008 |
| JP | 4380738 B2 | 12/2009 |
| WO | 2015/189932 A1 | 12/2015 |

OTHER PUBLICATIONS

International Search Report of the International Searching Authority dated May 29, 2018 for the corresponding International application No. PCT/JP2018/010926 (and English translation).

* cited by examiner

AIR CONDITIONING SYSTEM AND COMMUNICATION METHOD

CROSS REFERENCE TO RELATED APPLICATION

This application is a U.S. national stage application of PCT/JP2018/010926 filed on Mar. 20, 2018, the contents of which are incorporated herein by reference.

FIELD

The present invention relates to an air conditioning system in which devices communicate with each other, and a communication method.

BACKGROUND

An air conditioning system of related art includes a plurality of outdoor units, indoor units connected with the outdoor units, and a central control device that controls the operations of the outdoor units and the indoor units, and in the air conditioning system, the respective devices communicate with each other via communication lines. The air conditioning system of the related art performs communication by using low-speed and low-cost communication lines such as communication lines shared with power supply lines, which has experienced traffic congestion due to an increase in the communication volume caused by enhanced functions. There have thus been demands for replacement with a network enabling high-speed communication in air conditioning systems of the related art.

Patent Literature 1 describes a technology for assigning Internet protocol (IP) addresses to respective devices of an air conditioner connected with a high-speed network such as the Internet to perform high-speed communication. In Patent Literature 1, a router assigns IP addresses to the respective devices by using a dynamic host configuration protocol (DHCP) function so that IP communication can be performed between outdoor units and between indoor units in addition to communication between a central control device and the outdoor units. In Patent Literature 1, a management device creates a table associating IP addresses of the respective devices with device information of the respective devices, and shares the table among the devices.

CITATION LIST

Patent Literature

Patent Literature 1: Japanese Patent No. 4380738

SUMMARY

Technical Problem

The technology of Patent Literature 1 is, however, problematic in that complicated processes are needed for the process of sharing a table, associating the IP addresses of respective devices with the device information of the respective devices, among the devices and management of changes in the table, which imposes processing loads.

The present invention has been made in view of the above, and an object thereof is to provide an air conditioning system capable of reducing processing loads in generating addresses to be used for communication between devices and sharing address information among the devices.

Solution to Problem

To solve the aforementioned problems and achieve the object, an aspect of the present invention provides an air conditioning system including: a plurality of outdoor units; a plurality of indoor units, each communicating with any one of the outdoor units by a first communication method; and a central control device communicating with each of the outdoor units by a second communication method and controlling the outdoor units and the indoor units. One of the outdoor units generates, by using a first address assigned to the one of the outdoor units, a second address of the one of the outdoor units, generates, by using a first address assigned to one or more indoor units connected with the one of the outdoor units among the indoor units, a second address of the one or more indoor units, obtains, from another of the outdoor units, a second address generated by the another of the outdoor units, and obtains, from the central control device, a second address of the central control device, the first address being used for communication performed using the first communication method and the second address being used for communication performed using the second communication method. The central control device obtains, from each of the outdoor units, the second addresses of a corresponding one of the outdoor units and each of the indoor units generated by the corresponding one of the outdoor units, and controls an operation of the outdoor units and the indoor units by using the second addresses obtained.

Advantageous Effects of Invention

An air conditioning system according to the present invention produces an effect of enabling a reduction of the processing loads in generating addresses to be used for communication between devices and sharing address information among the devices.

DESCRIPTION OF EMBODIMENTS

An air conditioning system and a communication method according to embodiments of the present invention will be described in detail below with reference to the drawings. Note that the present invention is not limited to the embodiments.

First Embodiment

Figure 1:
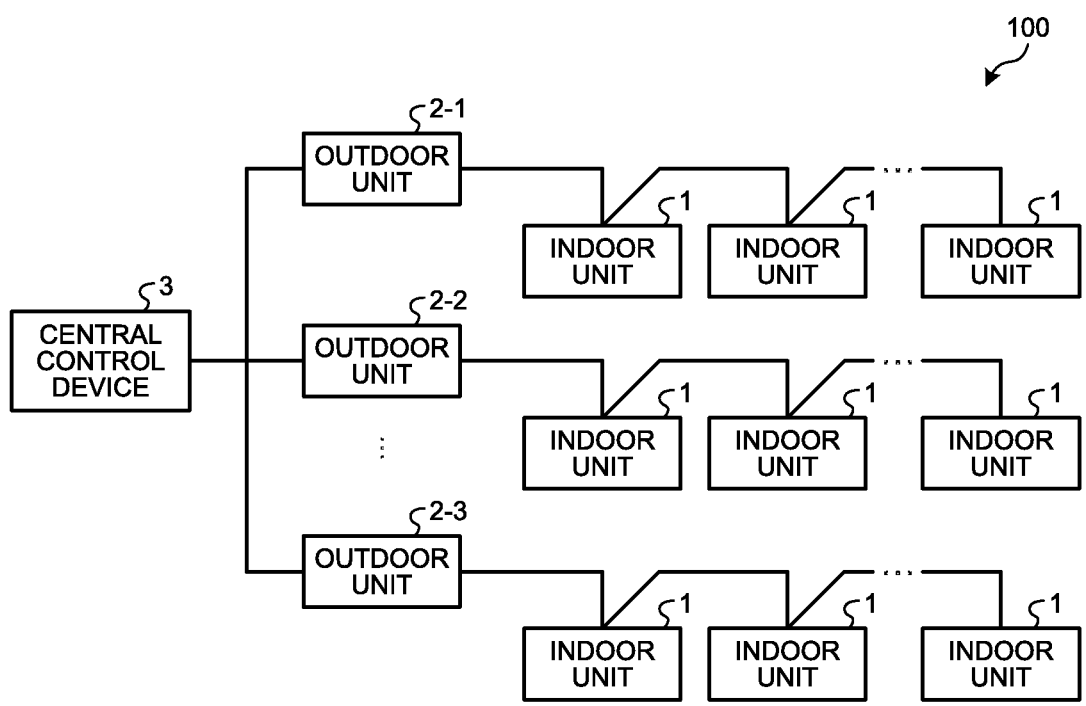
FIG. 1 is a diagram illustrating an example of a configuration of an air conditioning system according to a first embodiment.

FIG. 1 is a diagram illustrating an example of a configuration of an air conditioning system 100 according to a first embodiment of the present invention. The air conditioning system 100 includes a plurality of indoor units 1, outdoor units 2-1 to 2-3, and a central control device 3. Each of the outdoor units 2-1 to 2-3 may be referred to as an outdoor unit 2 when the outdoor units 2-1 to 2-3 are not distinguished from one another. In addition, each of the indoor units 1, the outdoor units 2, and the central control device 3 may be referred to as a "device".

The central control device 3 controls operations of one or more outdoor units 2 and a plurality of indoor units 1. The central control device 3 receives user's operation for a set temperature or the like using an operation button or the like, which is not illustrated, and generates a control command on the basis of the operation received from the user. The central control device 3 controls the operation of an outdoor unit 2 or an indoor unit 1 to be controlled by sending a control command to the outdoor unit 2 or the indoor unit 1 to be controlled.

The outdoor units 2-1 to 2-3 are connected with one central control device 3. In addition, the outdoor units 2-1 to 2-3 are each connected with one or more indoor units 1, which are different from those connected with the other outdoor units 2. The number of indoor units 1 connected with each of the outdoor units 2-1 to 2-3 is not limited, and the numbers of indoor units 1 connected with the individual outdoor units 2-1 to 2-3 may be different from each other. The outdoor units 2-1 to 2-3 each control the operation thereof on the basis of a control command received from the central control device 3. Upon receiving a control command for an indoor unit 1 from the central control device 3, the outdoor units 2-1 to 2-3 transmit the control command to the indoor unit 1 to which the control command is addressed.

The indoor units 1 are each connected directly or indirectly with one of the outdoor units 2-1 to 2-3. The indoor units 1 each perform air-conditioning control of a space to be controlled, which is not illustrated, on the basis of a control command received from the central control device 3 via the outdoor unit 2.

The air conditioning system 100 is assumed to be used for air-conditioning control in an office building, a commercial building, a public facility, and the like. The air conditioning system 100 is a packaged air conditioner, for example. In the air conditioning system 100, the outdoor units 2-1 to 2-3 each communicate with one or more indoor units 1 connected therewith via a lower-level network by a first communication method. Communication by the first communication method is communication via the Ethernet (registered trademark), power line communication (PLC), or the like. Communication by the first communication method may be cable communication or radio communication. In the air conditioning system 100, the range in which communication by the first communication method is performed is indicated by thin lines in FIG. 1, and the range in which communication by the first communication method is performed will be referred to as a lower-level network.

In addition, in the air conditioning system 100, the outdoor units 2-1 to 2-3 each communicate with the central control device 3 via a higher-level network by a second communication method. Communication by the second communication method is IP communication, such as communication via the Ethernet, for example. Communication by the second communication method may be cable communication using communication lines such as twisted pair cables, coaxial cables, and optical fiber cables, or may be communication lines using IPv4, IPv6, and the like for radio communication using WiFi (registered trademark), specified low power radio, and the like. In the air conditioning system 100, the range in which communication by the second communication method is performed is indicated by thick lines in FIG. 1, and the range in which communication by the second communication method is performed will be referred to as a higher-level network.

As described above, in the air conditioning system 100, each outdoor unit 2 communicates with indoor units 1 via the lower-level network by the first communication method, and communicates with the other outdoor unit 2 and the central control device 3 via the higher-level network by the second communication method. In the air conditioning system 100, the first communication method and the second communication method are communication methods different from each other. Thus, the central control device 3 and the indoor units 1 cannot communicate directly with each other by using addresses in each communication method set for the respective devices.

In the present embodiment, each outdoor unit 2 generates a second address thereof to be used for communication by the second communication method by using a first address thereof used for communication by the first communication method. In addition, each outdoor unit 2 generates, for each of the indoor units 1 connected with the outdoor unit 2, a virtual, second address to be used for communication by the second communication method by using the first address used for communication by the first communication method. The second address generated for each indoor unit 1 is an address to be used by the outdoor units 2 and the central control device 3 in the higher-level network. The second address generated for each indoor unit 1 is a virtual address for the indoor unit 1 because the indoor unit 1 does not directly use the second address. Each outdoor unit 2 obtains, from the other outdoor units 2, the second addresses of the other outdoor units 2 generated by the other outdoor units 2 and the second addresses of the indoor units 1, connected with the other outdoor units 2, generated by the other outdoor units 2, and obtains the second address of the central control device 3 from the central control device 3. In addition, the central control device 3 obtains, from each of the outdoor units 2-1 to 2-3, the second address of the outdoor unit 2 generated by the outdoor unit 2 and the second addresses of the indoor units 1, connected with the outdoor unit 2, generated by the outdoor unit 2. This enables the central control device 3 to control the operations of the outdoor units 2 and the indoor units 1 by transmitting control commands by using the second addresses.

Figure 2:
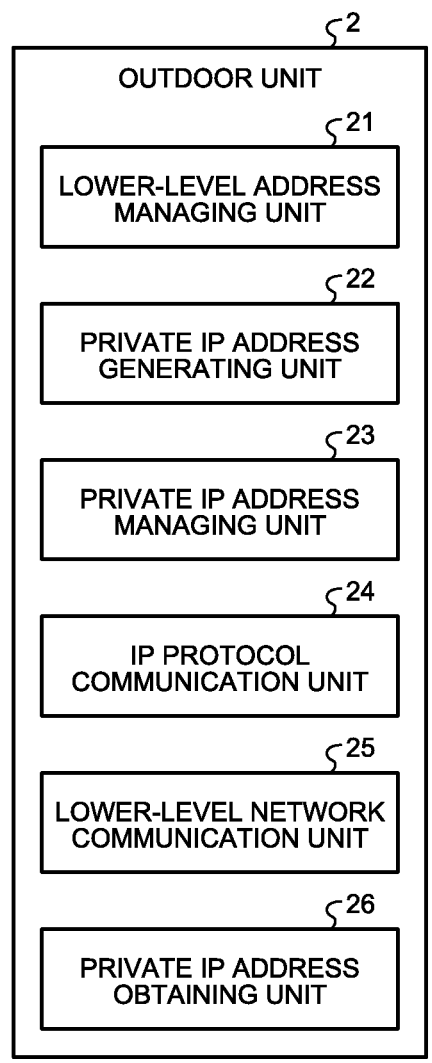
FIG. 2 is a block diagram illustrating an example of a configuration of an outdoor unit according to the first embodiment.

Next, a configuration of an outdoor unit 2 will be described. FIG. 2 is a block diagram illustrating an example of the configuration of an outdoor unit 2 according to the first embodiment. The outdoor unit 2 includes a lower-level address managing unit 21, a private IP address generating unit 22, a private IP address managing unit 23, an IP protocol communication unit 24, a lower-level network communication unit 25, and a private IP address obtaining unit 26.

The lower-level address managing unit 21 holds the lower-level addresses used in the lower-level network, that is, the first addresses used for communication by the first communication method. The first addresses are addresses for specifying the respective devices in the lower-level network. The first addresses are set, that is, assigned to the respective outdoor units 2 in advance by a user, such as an administrator of the air conditioning system 100, when constructing the air conditioning system 100. When constructing the air conditioning system 100, the administrator of the air conditioning system 100 also sets the first addresses for the respective indoor units 1 in advance. The administrator of the air conditioning system 100 sets the first addresses for the respective outdoor units 2 and the respective indoor units 1 in such a manner that the first addresses are defined uniquely for the respective devices and do not overlap among the respective devices. Regarding the first addresses set for the respective outdoor units 2 and the respective indoor units 1, the administrator of the air conditioning system 100 may divide the range of the addresses that can be used for each of the outdoor units 2 and the indoor units 1, and include device information that enables identification of the outdoor unit 2 or the indoor unit 1 in each of the first addresses.

Figure 3:
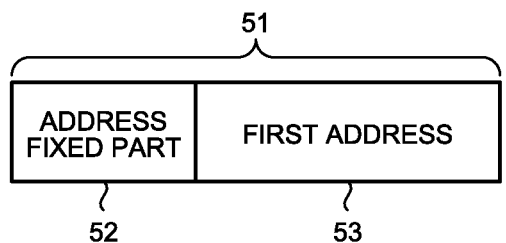
FIG. 3 is a diagram illustrating an example of a second address generated by a private IP address generating unit of an outdoor unit according to the first embodiment.

The private IP address generating unit 22 reads the first addresses, which are the lower-level addresses, from the lower-level address managing unit 21. The private IP address generating unit 22 generates private IP addresses to be used in the higher-level network, that is, the second addresses to be used for communication by the second communication method, by using the read first addresses. Specifically, the private IP address generating unit 22 generates a second address in such a manner that the second address includes a first address. The second addresses are addresses for specifying the respective devices in the higher-level network. FIG. 3 is a diagram illustrating an example of a second address 51 generated by the private IP address generating unit 22 of an outdoor unit 2 according to the first embodiment. The second address 51 is constituted by an address fixed part 52 and a first address 53. The first address 53 is a first address read from the lower-level address managing unit 21 by the private IP address generating unit 22. The position of the first address 53 in the second address 51 is fixed. The address fixed part 52 includes information on a class of the second address 51. The class is an address class set for an IP address. The method for determining the class by the private IP address generating unit 22 is not limited. For example, eight bits are used to express a class A, twelve bits are used to express a class B, and sixteen bits are used to express a class C. Thus, when the number of bits of the second address 51 is defined, as long as the first address 53 can be expressed by the remaining bits other than the bits expressing the class, the private IP address generating unit 22 can determine the class of the second address to be any class. The private IP address generating unit 22 may determine the class by using one or more of the number of outdoor units 2 in the air conditioning system 100 and the number of the indoor units 1 connected with the outdoor unit 2. In the outdoor unit 2, the lower-level network communication unit 25 checks connection with the indoor units 1 via the lower-level network, and the IP protocol communication unit 24 checks connection with the other outdoor units 2 and the central control device 3 via the higher-level network, to determine the number of devices connected with the outdoor unit 2, for example.

In addition, the private IP address generating unit 22 obtains the first address from an indoor unit 1 connected with the outdoor unit 2, and generates a virtual, second address, that is, a private IP address of the indoor unit 1, by using the obtained first address. The method by which the private IP address generating unit 22 generates a second address of an indoor unit 1 is similar to the aforementioned method for generating the second addresses of the outdoor units 2.

The private IP address managing unit 23 holds the second addresses of the outdoor unit 2 and the indoor units 1 generated by the private IP address generating unit 22. The private IP address managing unit 23 also holds the second addresses of the other outdoor units 2 and the indoor units 1, connected with the other outdoor units 2, generated by the other outdoor units 2 and obtained by the private IP address obtaining unit 26. The private IP address managing unit 23 also holds the second address of the central control device 3 obtained by the private IP address obtaining unit 26. The private IP address managing unit 23 holds the second addresses by using an address resolution protocol (ARP) table indicating the association between the IP addresses, that is, the second addresses of the respective devices and media access control (MAC) addresses of the respective devices, for example.

The IP protocol communication unit 24 communicates with the other outdoor units 2 and the central control device 3 via the higher-level network by the second communication method by using the second addresses.

The lower-level network communication unit 25 communicates with the indoor units 1 via the lower-level network by the first communication method by using the first addresses.

The private IP address obtaining unit 26 obtains, from the other outdoor units 2, the second addresses of the other outdoor units 2 generated by the other outdoor units 2 and the second addresses of the indoor units 1, connected with the other outdoor units 2, generated by the other outdoor units 2. The private IP address obtaining unit 26 also obtains the second address of the central control device 3 from the central control device 3. When the second addresses are held in the respective outdoor units 2 and the central control device 3 with use of ARP tables, for example, the private IP address obtaining unit 26 can obtain the second addresses by referring to the ARP tables in the other outdoor units 2 and the central control device 3. The private IP address obtaining unit 26 outputs the second addresses obtained from the other outdoor units 2 and the central control device 3 to the private IP address managing unit 23.

Figure 4:
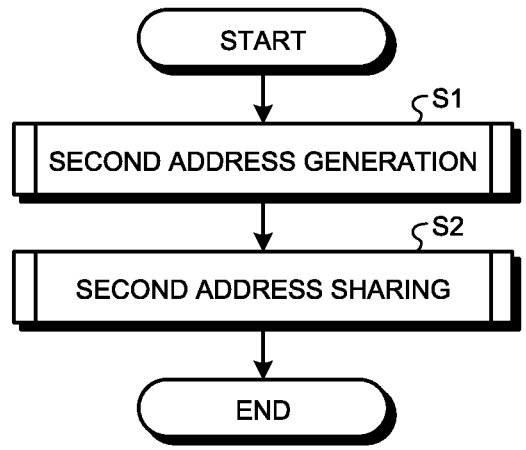
FIG. 4 is a flowchart illustrating operations of an outdoor unit according to the first embodiment.

Next, description will be given of operations for generating a second address by using the first address, obtaining the second addresses from the other outdoor units 2 and the central control device 3, and sharing the second addresses, performed by the outdoor unit 2. FIG. 4 is a flowchart illustrating the operations of the outdoor unit 2 according to the first embodiment. The outdoor unit 2 starts the operations in the flowchart illustrated in FIG. 4 upon being connected with at least one of the other outdoor units 2 and the central control device 3 via the higher-level network as a trigger.

In the outdoor unit 2, the private IP address generating unit 22 generates second addresses of the outdoor unit 2 and the indoor units 1 connected with the outdoor unit 2 by using the first addresses of the outdoor unit 2 and the indoor units 1 connected with the outdoor unit 2 (step S1). The private IP address managing unit 23 holds the second addresses generated by the private IP address generating unit 22. The private IP address obtaining unit 26 obtains, from the other outdoor units 2, the second addresses of the other outdoor units 2 generated by the other outdoor units 2 and the second addresses of the indoor units 1, connected with the other outdoor units 2, generated by the other outdoor units 2, obtains the second address of the central control device 3 from the central control device 3, and shares the second addresses with the other outdoor units 2 and the central control device 3 (step S2). The private IP address managing unit 23 holds the second addresses obtained from the other outdoor units 2 and the central control device 3 by the private IP address obtaining unit 26. Note that, after the process in step S2 or concurrently therewith, the other outdoor units 2 and the central control device 3 obtain the generated second addresses from the outdoor unit 2 that has obtained the second addresses from the other outdoor units 2 and the central control device 3. In this manner, the respective devices in the air conditioning system 100 can share the second addresses.

Figure 5:
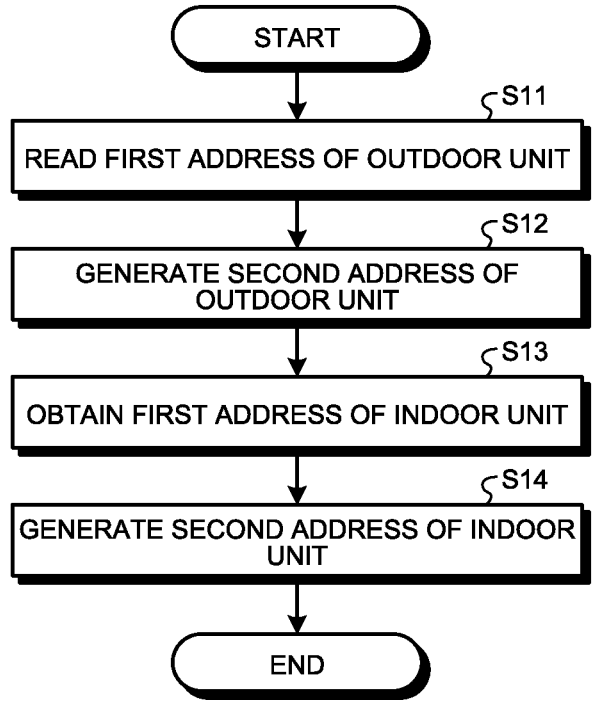
FIG. 5 is a flowchart illustrating operations for generating a second address by an outdoor unit according to the first embodiment.

FIG. 5 is a flowchart illustrating operations for generating a second address by an outdoor unit 2 according to the first embodiment. The flowchart illustrated in FIG. 5 corresponds to details of the operation in step S1 of the flowchart illustrated in FIG. 4.

In the outdoor unit 2, the private IP address generating unit 22 reads the first address of the outdoor unit 2 from the lower-level address managing unit 21 (step S11). The private IP address generating unit 22 generates a second address of the outdoor unit 2 by using the read first address (step S12). The private IP address managing unit 23 holds the second address of the outdoor unit 2 generated by the private IP address generating unit 22. Subsequently, the private IP address generating unit 22 obtains a first address of an indoor unit 1 connected with the outdoor unit 2 from the indoor unit 1 (step S13). The private IP address generating unit 22 generates a second address of the indoor unit 1 connected with the outdoor unit 2 by using the obtained first address (step S14). The private IP address managing unit 23 holds the second address of the indoor unit 1 generated by the private IP address generating unit 22. When a plurality of indoor units 1 are connected with the outdoor unit 2, the private IP address generating unit 22 performs the operations in steps S13 and S14 on all of the indoor units 1.

Figure 6:
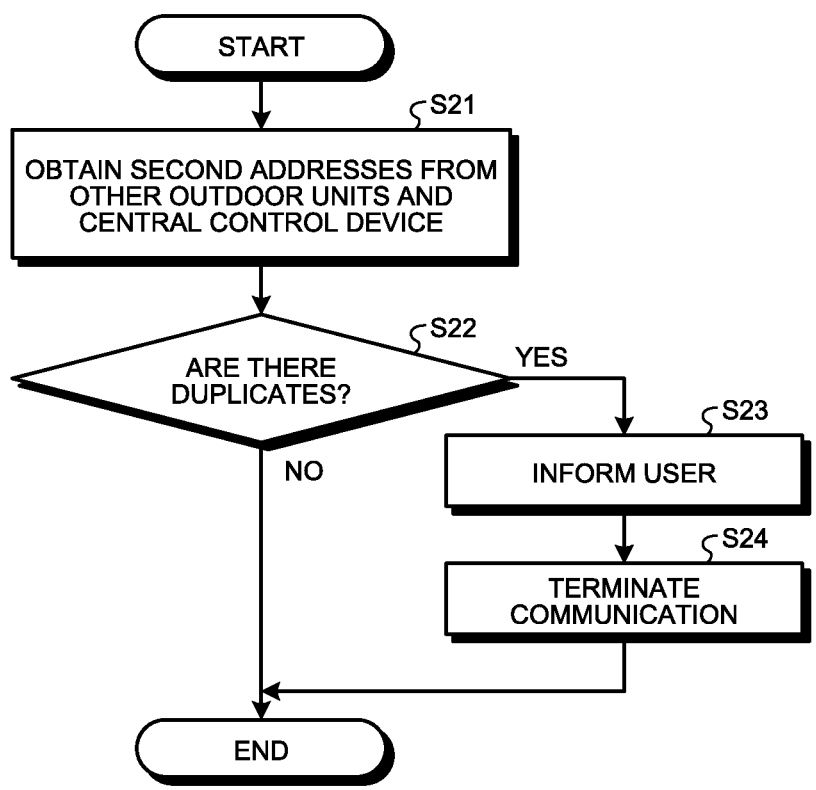
FIG. 6 is a flowchart illustrating operations for sharing second addresses by an outdoor unit with the other outdoor units and a central control device according to the first embodiment.

FIG. 6 is a flowchart illustrating operations for sharing second addresses by the outdoor unit 2 with the other outdoor units 2 and the central control device 3 according to the first embodiment. The flowchart illustrated in FIG. 6 corresponds to details of the operation in step S2 of the flowchart illustrated in FIG. 4.

The private IP address obtaining unit 26 obtains, from the other outdoor units 2, the second addresses of the other outdoor units 2 generated by the other outdoor units 2 and the second addresses of the indoor units 1, connected with the other outdoor units 2, generated by the other outdoor units 2. The private IP address obtaining unit 26 also obtains the second address of the central control device 3 from the central control device 3 (step S21). The private IP address managing unit 23 holds the second addresses obtained by the private IP address obtaining unit 26. The private IP address managing unit 23 checks whether or not there are any duplicate addresses between the second addresses generated by the outdoor unit 2 and the second addresses obtained from the other outdoor units 2 and the central control device 3 (step S22). If there are no duplicate addresses (step S22: No), the private IP address managing unit 23 terminates the process. If there are duplicate addresses (step S22: Yes), the private IP address managing unit 23 informs the user of information indicating that there are duplicate addresses (step S23). This enables the user to know that there are duplicate addresses among the first addresses used for generating the second addresses and that of any of the devices. The private IP address managing unit 23 terminates communication by the second communication method via the higher-level network for the reason that a device with the duplicate first address is present (step S24).

If there are no duplicate second addresses in the process in the flowchart illustrated in FIG. 6 (step S22: No), the outdoor unit 2 can start communication in the air conditioning system 100. In the air conditioning system 100, when the central control device 3 controls an indoor unit 1, the central control device 3 generates a control command addressed to the indoor unit 1 to be controlled by using the second address of the indoor unit 1 to be controlled, and transmits the control command. Upon receiving the control command addressed to the indoor unit 1 to be controlled from the central control device 3, the outdoor unit 2 connected with the indoor unit 1 to be controlled transmits the control command to the indoor unit 1 to be controlled by using the first address of the indoor unit 1 to be controlled included in the second address of the indoor unit 1 to be controlled. Because the first address is included in the second address, the outdoor unit 2 can easily transmit the control command, addressed to the indoor unit 1 to be controlled, received from the central control device 3 to the indoor unit 1 to be controlled.

Figure 7:
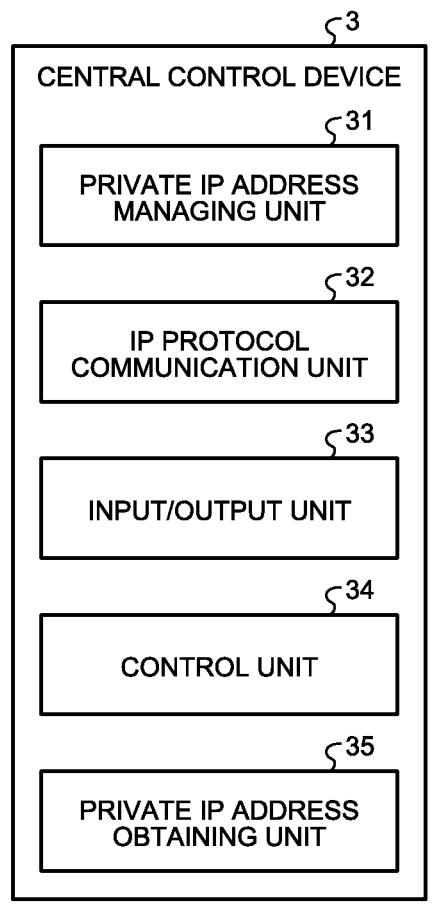
FIG. 7 is a block diagram illustrating an example of a configuration of the central control device according to the first embodiment.

Next, a configuration of the central control device 3 will be described. FIG. 7 is a block diagram illustrating an example of the configuration of the central control device 3 according to the first embodiment. The central control device 3 includes a private IP address managing unit 31, an IP protocol communication unit 32, an input/output unit 33, a control unit 34, and a private IP address obtaining unit 35.

The private IP address managing unit 31 holds private IP addresses to be used in the higher-level network, that is, second addresses to be used for communication by the second communication method. Because the central control device 3 does not perform communication via the lower-level network, that is, by the second communication method, the administrator of the air conditioning system 100 need not set a first address for the central control device 3. Thus, the administrator of the air conditioning system 100 directly sets a second address for the central control device 3. The administrator of the air conditioning system 100 sets a second address for the central control device 3 in such a manner that the second address does not overlap any of the second addresses generated by the respective outdoor units 2. The private IP address managing unit 31 holds the second address set by the administrator of the air conditioning system 100. The private IP address managing unit 31 also holds the second addresses of the outdoor units 2 and the indoor units 1, connected with the outdoor units 2, generated by the outdoor units 2 and obtained by the private IP address obtaining unit 35. The private IP address managing unit 31 holds the second addresses by using an ARP table, for example.

The IP protocol communication unit 32 performs communication with the outdoor units 2 by using the second addresses in the higher-level network by the second communication method.

The input/output unit 33 receives user's operation for the operation mode of air conditioning, the set temperature, and the like. The aforementioned operation button, which is not illustrated, corresponds to the input/output unit 33.

The control unit 34 generates a control command for controlling the operation of an outdoor unit 2 or an indoor unit 1 on the basis of an operation received by the input/output unit 33 from the user. The control unit 34 transmits the generated control command to the outdoor unit 2 via the IP protocol communication unit 32.

The private IP address obtaining unit 35 obtains, from the outdoor units 2, the second addresses of the outdoor units 2 generated by the outdoor units 2 and the second addresses of the indoor units 1, connected with the outdoor units 2, generated by the outdoor units 2. When the second addresses are held in the respective outdoor units 2 with use of ARP tables, for example, the private IP address obtaining unit 35 can obtain the second addresses by referring to the ARP tables in the respective outdoor units 2. The private IP address obtaining unit 35 outputs the second addresses obtained from the outdoor units 2 to the private IP address managing unit 31.

The central control device 3 is capable of obtaining the second addresses of all of the outdoor units 2 and the indoor units 1 included in the air conditioning system 100 illustrated in FIG. 1 by obtaining the second addresses from the respective outdoor units 2. The central control device 3 is also capable of easily obtaining connection states of the respective devices in the air conditioning system 100 illustrated in FIG. 1 by managing the second addresses of the outdoor units 2 and the second addresses of the indoor units 1 obtained from the outdoor units 2 for each of the outdoor units 2 from which the second addresses are obtained. This enables the central control device 3 to control the operations of the outdoor units 2 and the indoor units 1 by using the second addresses. The central control device 3 is capable of transmitting a control command to a plurality of indoor units 1 connected with a specific outdoor unit 2. For example, for controlling the operation of an indoor unit 1, the central control device 3 transmits a control command to the indoor unit 1 to be controlled by using the second address of the indoor unit 1 to be controlled. Upon receiving the control command from the central control device 3, the outdoor unit 2 connected with the indoor unit 1 to be controlled transmits the control command to the indoor unit 1 to be controlled by using the first address of the indoor unit 1 to be controlled.

In addition, in a case where the first addresses are set in a form including device information in the outdoor units 2 and the indoor units 1, the central control device 3 is capable of identifying the types of the devices having the second addresses by referring to the first address parts included in the second addresses.

While the case of the air conditioning system 100 in which the central control device 3 controls the outdoor units 2 and the indoor units 1, that is, the central control device 3 communicates with the outdoor units 2 and the indoor units 1 has been described, the air conditioning system 100 is not limited thereto. For example, an outdoor unit 2 may communicate with the other outdoor units 2 to control the operations of the indoor units 1 connected with the respective outdoor units 2 in cooperation with the other outdoor units 2, or an outdoor unit 2 may directly control the operations of the indoor units 1 connected with the other outdoor units 2.

Figure 8:
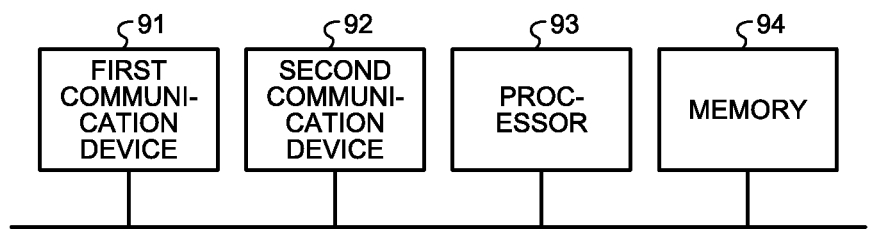
FIG. 8 is a diagram illustrating an example of a hardware configuration of an outdoor unit according to the first embodiment.

Next, a hardware configuration of an outdoor unit 2 will be described. FIG. 8 is a diagram illustrating an example of a hardware configuration of an outdoor unit 2 according to the first embodiment. In the outdoor unit 2, the lower-level network communication unit 25 is a first communication device 91 that performs communication by the first communication method in the lower-level network. The IP protocol communication unit 24 is a second communication device 92 that performs communication by the second communication method in the higher-level network. The private IP address managing unit 23 is a memory 94. The lower-level address managing unit 21, the private IP address generating unit 22, and the private IP address obtaining unit 26 are implemented by processing circuitry. The processing circuitry is constituted by a processor 93 that executes programs stored in the memory 94, and the memory 94, for example.

In the case where the processing circuitry is constituted by the processor 93 and the memory 94, the functions of the processing circuitry are implemented by software, firmware, or a combination of software and firmware. The software or firmware is described in the form of programs and stored in the memory 94. The processing circuitry implements the functions by reading and executing the programs stored in the memory 94 by the processor 93. In other words, these programs cause a computer to execute the procedures and the methods in the outdoor unit 2.

Note that the processor 93 may be a central processing unit (CPU), a processing device, a computing device, a microprocessor, a microcomputer, a digital signal processor (DSP), or the like. In addition, the memory 94 is a nonvolatile or volatile semiconductor memory such as a random access memory (RAM), a read only memory (ROM), a flash memory, an erasable programmable ROM (EPROM), or an electrically erasable programmable ROM (EEPROM: registered trademark), a magnetic disk, a flexible disk, an optical disk, a compact disc, a mini disc, a digital versatile disc (DVD), or the like, for example.

The processing circuitry may be dedicated hardware. In a case where the processing circuitry is constituted by dedicated hardware, the processing circuitry is a single circuit, a composite circuit, a programmed processor, a parallel-programmed processor, an application specific integrated circuit (ASIC), a field programmable gate array (FPGA), or a combination thereof, for example. The functions of the lower-level address managing unit 21, the private IP address generating unit 22, and the private IP address obtaining unit 26 may be implemented separately by a processing circuitry or may be implemented collectively by a processing circuitry.

Note that some of the functions of the outdoor units 2 may be implemented by dedicated hardware, and the others may be implemented by software or firmware. As described above, the processing circuitry is capable of implementing the above-described functions by dedicated hardware, software, firmware, or a combination thereof.

Figure 9:
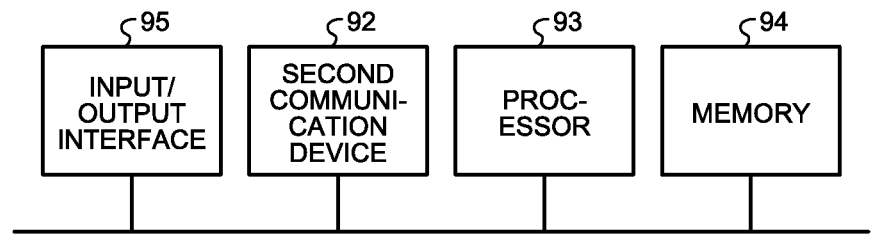
FIG. 9 is a diagram illustrating an example of a hardware configuration of the central control device according to the first embodiment.

Next, a hardware configuration of the central control device 3 will be described. FIG. 9 is a diagram illustrating an example of a hardware configuration of the central control device 3 according to the first embodiment. In the central control device 3, the input/output unit 33 is an input/output interface 95 such as a button or a touch panel. The IP protocol communication unit 32 is a second communication device 92 that performs communication by the second communication method in the higher-level network. The private IP address managing unit 31 is the memory 94. The control unit 34 and the private IP address obtaining unit 35 are implemented by a processing circuitry. The processing circuitry is constituted by the processor 93 that executes programs stored in the memory 94, and the memory 94, for example. Details of the processing circuitry are similar to those in the case of the outdoor unit 2 described above.

As described above, according to the present embodiment, an outdoor unit 2 generates second addresses to be used for communication with the central control device 3 and the other outdoor units 2, which is communication by the second communication method, by using the first addresses set for the outdoor unit 2 and the indoor units 1 connected with the outdoor unit 2 for use in communication by the first communication method. The outdoor unit 2 generates second addresses each including information on the first address. The respective outdoor units 2 and the central control device 3 only need to share ARP tables necessary for IP communication among the respective outdoor units 2 and the central control device 3, and need not generate and share special tables. The central control device 3 is capable of identifying and controlling the outdoor units 2 and the indoor units 1 individually by using the second addresses. As described above, in the air conditioning system 100, the processing loads on the respective devices can be reduced in the processes of generating second addresses necessary for communication between the devices by the second communication method and sharing the second addresses among the respective devices.

In addition, use of the air conditioning system 100 enables an existing air conditioning system to switch to IP communication by simple partial changes and with the configuration of the lower-level network maintained. This is particularly useful in a case where a higher-level part of an outdoor unit is partially replaced in an existing air conditioning system.

Second Embodiment

In the first embodiment, one central control device 3 controls all of the outdoor units 2 and the indoor units 1. Thus, as the numbers of outdoor units 2 and indoor units 1 increase, the load on the central control device 3 increases and resources required of the central control device 3 increase. In a second embodiment, extended control devices that coordinate the operations of outdoor units are introduced under the central control device 3, and the outdoor units to be controlled are divided among the central control device 3 and the extended control devices. The differences from the first embodiment will be described.

Figure 10:
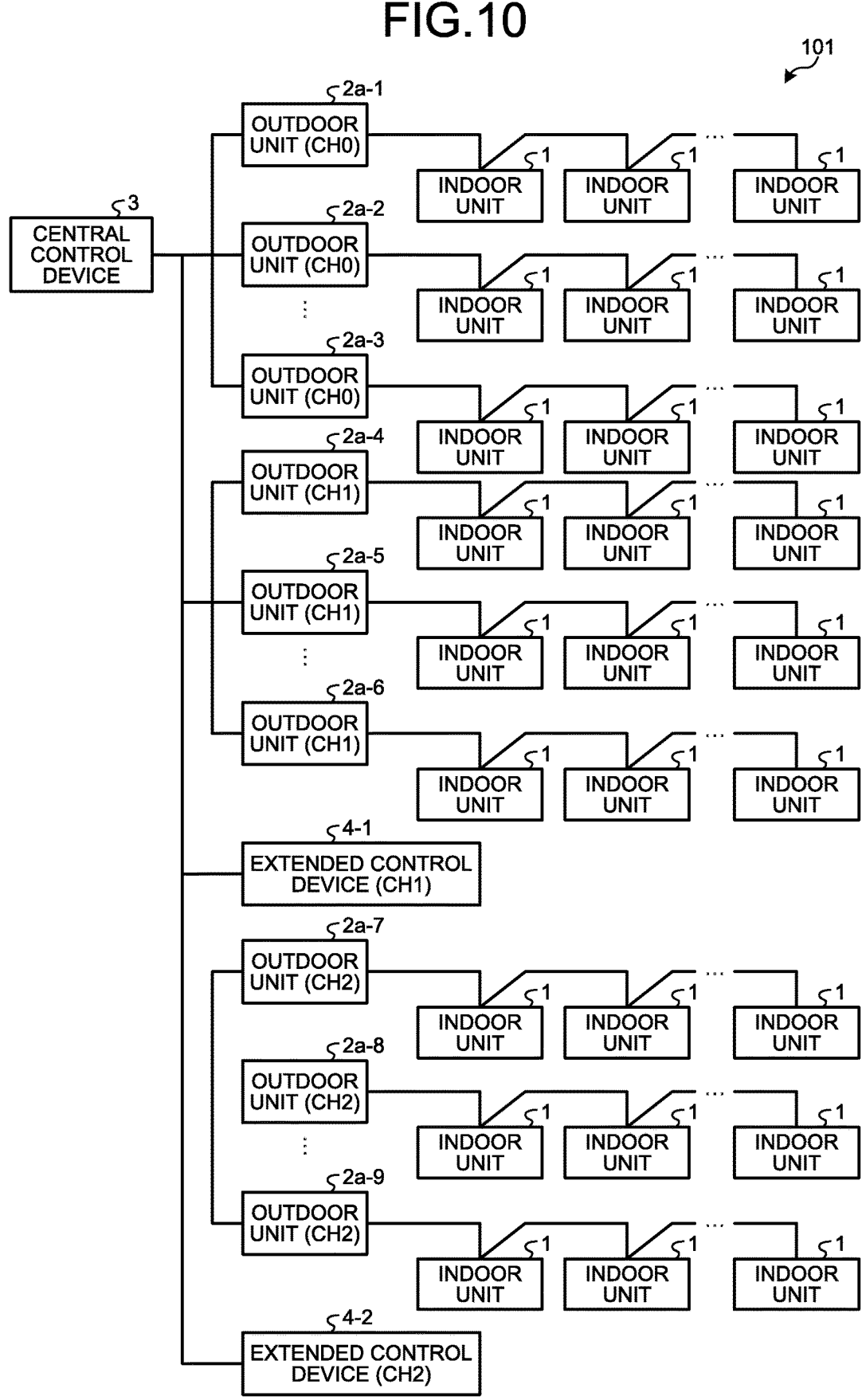
FIG. 10 is a diagram illustrating an example of a configuration of an air conditioning system according to a second embodiment.

FIG. 10 is a diagram illustrating an example of a configuration of an air conditioning system 101 according to the second embodiment. The air conditioning system 101 includes the indoor units 1, outdoor units 2a-1 to 2a-9, the central control device 3, and extended control devices 4-1 and 4-2. Each of the outdoor units 2a-1 to 2a-9 may be referred to as an outdoor unit 2a when the outdoor units 2a-1 to 2a-9 are not distinguished from one another. Each of the extended control devices 4-1 and 4-2 may be referred to as an extended control device 4 when the extended control devices 4-1 and 4-2 are not distinguished from each other. In addition, each of the indoor units 1, the outdoor units 2a, the central control device 3, and the extended control devices 4 may be referred to as a "device".

The extended control devices 4-1 and 4-2 communicate with the central control device 3 and the outdoor units 2a-1 to 2a-9 via the higher-level network by the second communication method. In the air conditioning system 101, the extended control devices 4-1 and 4-2 are connected with the central control device 3 at positions in parallel with the outdoor units 2a-1 to 2a-9. The extended control devices 4-1 and 4-2 each control outdoor units 2a and indoor units 1 that belong to the same control network, that is, that have the same network ID set therefor. A control network is a unit of control in the air conditioning system 101, which indicates division of devices to be controlled by the central control device 3 and the extended control devices 4-1 and 4-2. In the example of FIG. 10, the central control device 3, the outdoor units 2a-1 to 2a-3, and the indoor units 1 connected with the outdoor units 2a-1 to 2a-3 constitute one control network. In addition, the extended control device 4-1, the outdoor units 2a-4 to 2a-6, and the indoor units 1 connected with the outdoor units 2a-4 to 2a-6 constitute one control network. In addition, the extended control device 4-2, the outdoor units 2a-7 to 2a-9, and the indoor units 1 connected with the outdoor units 2a-7 to 2a-9 constitute one control network. In the air conditioning system 101, the number of extended control devices 4 is not limited to two, and may be any number not smaller than one.

Figure 11:
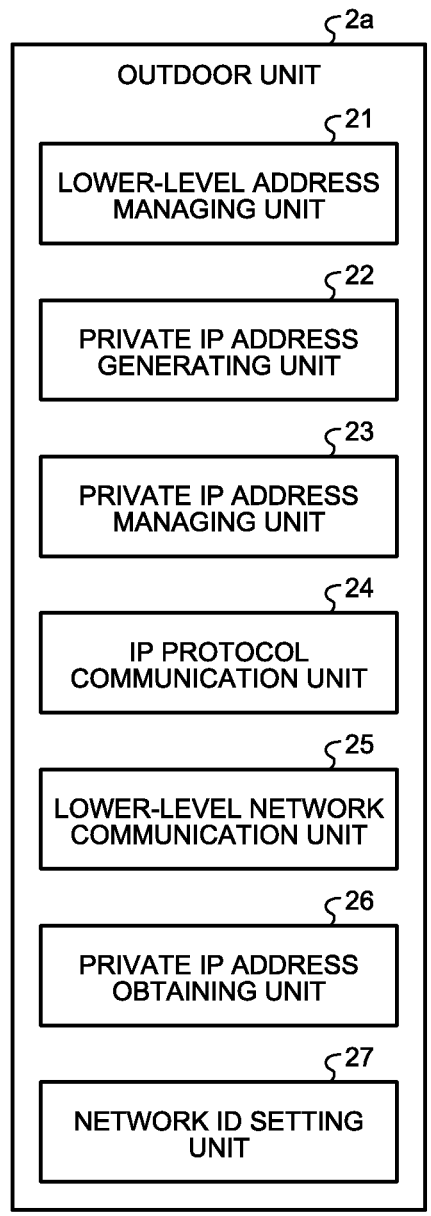
FIG. 11 is a block diagram illustrating an example of a configuration of an outdoor unit according to the second embodiment.

The outdoor units 2a-1 to 2a-9 each have, in addition to the functions of the outdoor unit 2 in the first embodiment, a network ID set therefor indicating the control relation with the extended control devices 4. FIG. 11 is a block diagram illustrating an example of the configuration of an outdoor unit 2a according to the second embodiment. The outdoor unit 2a corresponds to the outdoor unit 2 of the first embodiment illustrated in FIG. 2 but additionally includes a network ID setting unit 27. The network ID setting unit 27 receives setting of a network ID, which indicates the control relation with the extended control devices 4, through the user's operation. For example, in a case where the network ID setting unit 27 is a DIP switch installed in the body of the outdoor unit 2a, the user operates the DIP switch to set a network ID common to the extended control device 4 and the outdoor units 2a set in the same control network. Alternatively, in a case where the network ID setting unit 27 is a memory in which a network ID can be written, the user may write a network ID in the memory by using a terminal, which is not illustrated, to set a network ID common to the extended control device 4 and the outdoor units 2a set in the same control network. Note that, in FIG. 10, the network IDs set for the respective devices are expressed as CH0, CH1, and CH2. A non-changeable network ID CH0 is assumed to be set for the central control device 3 in advance.

Figure 12:
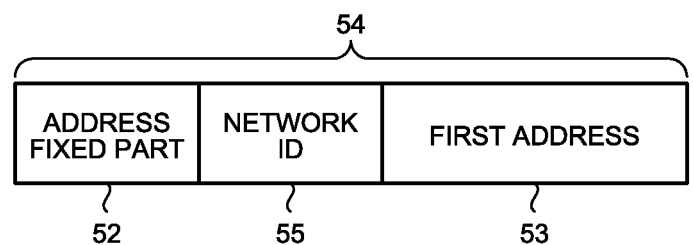
FIG. 12 is a diagram illustrating an example of a second address generated by a private IP address generating unit of an outdoor unit according to the second embodiment.

In the outdoor unit 2a, the private IP address generating unit 22 generates second addresses each including the network ID set by the network ID setting unit 27 in addition to the second address of the first embodiment. FIG. 12 is a diagram illustrating an example of a second address 54 generated by the private IP address generating unit 22 of an outdoor unit 2a according to the second embodiment. The second address 54 of the second embodiment corresponds to the second address 51 of the first embodiment illustrated in FIG. 3 but additionally includes a network ID 55. The position of the network ID 55 in the second address 54 is fixed. In a manner similar to the first embodiment, the method for determining the class of the second address 51 by the private IP address generating unit 22 is not particularly limited. When the number of bits of the second address 54 is defined, as long as the first address 53 can be expressed by the remaining bits other than the bits expressing the class and the bits used for the network ID 55, the private IP address generating unit 22 can determine the class to be any class. The private IP address generating unit 22 may determine the class by using one or more of the number of extended control devices 4, the number of outdoor units 2a in the air conditioning system 101, and the number of indoor units 1 connected with the outdoor units 2a. In the outdoor unit 2a, the lower-level network communication unit 25 checks connection with the indoor units 1 via the lower-level network, and the IP protocol communication unit 24 checks connection with the other outdoor units 2a, the central control device 3, and the extended control device 4 via the higher-level network, to determine the number of devices connected with the outdoor unit 2a, for example. The private IP address generating unit 22 also generates second addresses 54 additionally including the network ID 55 for the indoor units 1 connected with the outdoor unit 2a.

Next, description will be given of operations for generating a second address by using the first address, obtaining the second addresses from the other outdoor units 2a, the central control device 3, and the extended control devices 4, and sharing the second addresses, performed by the outdoor unit 2a. The outline of the operations of the outdoor unit 2a is similar to the flowchart of the first embodiment illustrated in FIG. 4. The second embodiment is different from the first embodiment in the operations in the respective steps of the flowchart of the first embodiment illustrated in FIG. 4.

Figure 13:
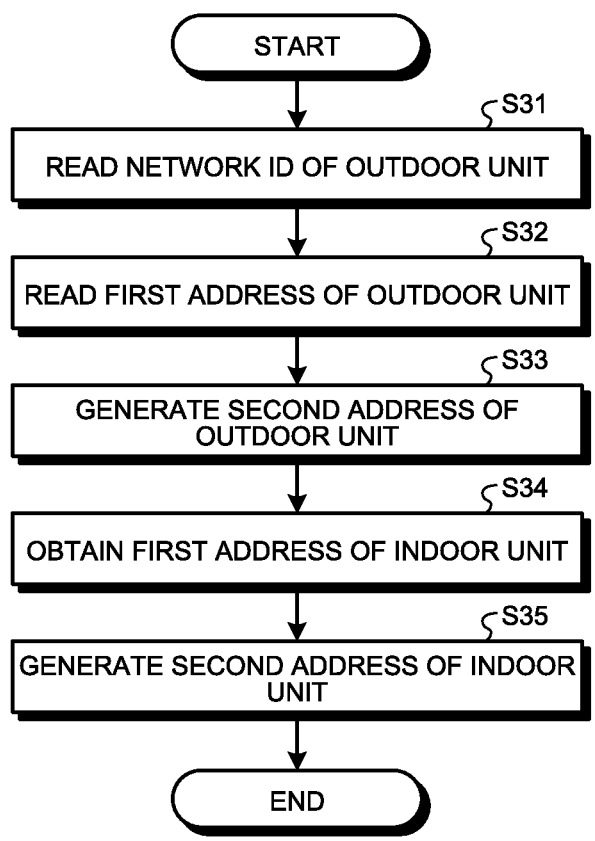
FIG. 13 is a flowchart illustrating operations for generating a second address by an outdoor unit according to the second embodiment.

FIG. 13 is a flowchart illustrating operations for generating a second address by an outdoor unit 2a according to the second embodiment. The flowchart illustrated in FIG. 13 corresponds to details of the operation in step S1 of the flowchart illustrated in FIG. 4.

In the outdoor unit 2a, the private IP address generating unit 22 reads the network ID set for the outdoor unit 2a from the network ID setting unit 27 (step S31). The private IP address generating unit 22 reads the first address of the outdoor unit 2a from the lower-level address managing unit 21 (step S32). The private IP address generating unit 22 generates a second address of the outdoor unit 2a by using the read network ID and first address (step S33). The private IP address managing unit 23 holds the second address of the outdoor unit 2a generated by the private IP address generating unit 22. Subsequently, the private IP address generating unit 22 obtains a first address of an indoor unit 1 connected with the outdoor unit 2a from the indoor unit 1 (step S34). The private IP address generating unit 22 generates a second address of the indoor unit 1 by using the network ID set for the outdoor unit 2a and the obtained first address (step S35). The private IP address managing unit 23 holds the second address of the indoor unit 1 generated by the private IP address generating unit 22. When a plurality of indoor units 1 are connected with the outdoor unit 2a, the private IP address generating unit 22 performs the operations in steps S34 and S35 on all of the indoor units 1.

The network ID set for the outdoor unit 2a may be used also for the network ID of the indoor unit 1, or a network ID may be set for the indoor unit 1. In the case where the network ID set for the outdoor unit 2a is used also for the network ID of the indoor unit 1, the outdoor unit 2a generates a second address of an indoor unit 1 connected with the outdoor unit 2a by using the network ID set for the outdoor unit 2a as described above. In the case where a network ID can be set for an indoor unit 1, the user sets, for the indoor unit 1, a network ID common to the extended control device 4 and the outdoor units 2a set in the same control network. The outdoor unit 2a obtains the network ID and the first address from an indoor unit 1 connected with the outdoor unit 2a, and generates a second address of the indoor unit 1 connected with the outdoor unit 2a by using the obtained network ID and first address.

While the volume of the operations for sharing second addresses with the other outdoor units 2a, the central control device 3, and the extended control devices 4 performed by the outdoor unit 2a is increased as compared with that in the flowchart of the first embodiment illustrated in FIG. 6 as the devices from which second addresses are obtained have increased by the additional extended control devices 4, the operations themselves are similar. Thus, detailed explanation thereof is not provided.

The outdoor unit 2a has a hardware configuration similar to that of the first embodiment illustrated in FIG. 8.

Figure 14:
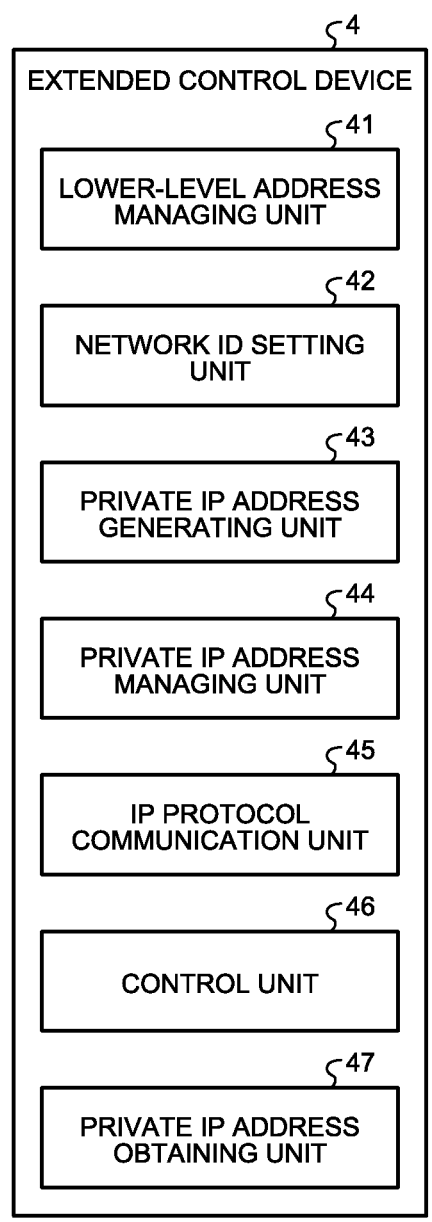
FIG. 14 is a block diagram illustrating an example of a configuration of an extended control device according to the second embodiment.

Next, a configuration of the extended control device 4 will be described. FIG. 14 is a block diagram illustrating an example of the configuration of the extended control device 4 according to the second embodiment. The extended control device 4 includes a lower-level address managing unit 41, a network ID setting unit 42, a private IP address generating unit 43, a private IP address managing unit 44, an IP protocol communication unit 45, a control unit 46, and a private IP address obtaining unit 47. The lower-level address managing unit 41, the network ID setting unit 42, the private IP address generating unit 43, the private IP address managing unit 44, the IP protocol communication unit 45, and the private IP address obtaining unit 47 perform operations similar to those of the lower-level address managing unit 21, the network ID setting unit 27, the private IP address generating unit 22, the private IP address managing unit 23, the IP protocol communication unit 24, and the private IP address obtaining unit 26, respectively, of the outdoor unit 2a. The control unit 46 performs control on outdoor units 2a, for which the same network ID is set, on the basis of a control command from the central control device 3. In addition, the control unit 46 may perform control on outdoor units 2a and indoor units 1, for which the same network ID is set, without control commands from the central control device 3. The control unit 46 may perform control on indoor units 1 across a plurality of outdoor units 2a by group management, or may control the outdoor units 2a on the basis of power consumptions of the outdoor units 2a, for example.

A control command transmitted from the central control device 3 to an extended control device 4 need not indicate a specific control on each device as in the first embodiment. For example, the central control device 3 transmits information on an operation received from a user by the input/output unit 33 to an extended control device 4 by using the second address of the extended control device 4. The extended control device 4 generates a control command for an outdoor unit 2a or an indoor unit 1, for which the same network ID is set, on the basis of the information on the operation received from the user by the central control device 3. The extended control device 4 transmits the control command to the outdoor unit 2a to be controlled or an outdoor unit 2a connected with the indoor unit 1 to be controlled, by using the second address of the outdoor unit 2a to be controlled or the indoor unit 1 to be controlled for which the same network ID is set. In a case where the control command is addressed to the indoor unit 1 to be controlled, upon receiving the control command from the extended control device 4, the outdoor unit 2a connected with the indoor unit 1 to be controlled transmits the control command to the indoor unit 1 to be controlled, by using the first address of the indoor unit 1 to be controlled. As described above, the air conditioning system 101 is capable of reducing the processing load on the central control device 3 by distributing control on the outdoor units 2 and the indoor units 1 among the central control device 3 and the extended control devices 4.

The extended control devices 4 has a hardware configuration similar to that of the central control device 3 of the first embodiment illustrated in FIG. 9 from which the input/output interface 95 is excluded.

As described above, according to the present embodiment, in the air conditioning system 101 in which the extended control devices 4 are introduced, the second addresses of the respective devices are shared among the outdoor units 2a, the central control device 3, and the extended control devices 4. As a result, the air conditioning system 101 can produce effects similar to those in the first embodiment, and achieve distribution of the load on the central control device 3 by the introduction of the extended control devices 4.

The configurations presented in the embodiments above are examples of the present invention, and can be combined with other known technologies or can be partly omitted or modified without departing from the scope of the present invention.

REFERENCE SIGNS LIST

1 indoor unit; 2, 2-1 to 2-3, 2a, 2a-1 to 2a-9 outdoor unit; 3 central control device; 4, 4-1, 4-2 extended control device; 21, 41 lower-level address managing unit; 22, 43 private IP address generating unit; 23, 31, 44 private IP address managing unit; 24, 32, 45 IP protocol communication unit; 25 lower-level network communication unit; 26, 35, 47 private IP address obtaining unit; 27, 42 network ID setting unit; 33 input/output unit; 34, 46 control unit; 100, 101 air conditioning system.

The invention claimed is:

1. An air conditioning system comprising:
a plurality of outdoor units;
a plurality of indoor units, each communicating with any one of the outdoor units by a first communication method; and
a central control device communicating with each of the outdoor units by a second communication method and controlling the outdoor units and the indoor units, wherein
the one of the outdoor units generates, by using a first address assigned to the one of the outdoor units, a second address of the one of the outdoor units, generates, by using a first address assigned to one or more indoor units connected with the one of the outdoor units among the indoor units, a second address of the one or more indoor units, obtains, from another of the outdoor units, a second address generated by the another of the outdoor units, obtains, from the central control device, a second address of the central control device, checks whether or not there is a duplicate address between the second addresses generated and the second addresses obtained, and, if there is a duplicate address, provides information indicating that there is a duplicate address, the first address being used for communication performed using the first communication method and the second address being used for communication performed using the second communication method, and
the central control device obtains, from each of the outdoor units, the second addresses of a corresponding one of the outdoor units and each of the indoor units generated by the corresponding one of the outdoor units, and controls an operation of the outdoor units and the indoor units by using the second addresses obtained.

2. The air conditioning system according to claim 1, wherein
for controlling an operation of an indoor unit, the central control device transmits a control command addressed to the indoor unit to be controlled by using the second address of the indoor unit to be controlled, and
upon receiving the control command from the central control device, an outdoor unit connected with the indoor unit to be controlled transmits the control command to the indoor unit to be controlled by using the first address of the indoor unit to be controlled.

3. The air conditioning system according to claim 1, wherein
the outdoor units determine a class of the second address by using one or more of the number of the outdoor units and the number of indoor units connected with the outdoor units.

4. The air conditioning system according to claim 1, comprising:
at least one extended control device communicating with the central control device and the outdoor units by the second communication method and controlling an outdoor unit and an indoor unit belonging to a same control network, wherein
the outdoor units and the extended control device generate a second address including identification information on the control network.

5. The air conditioning system according to claim 4, wherein
the central control device transmits information on an operation received from a user to the extended control device by using a second address of the extended control device,
the extended control device generates a control command on a basis of the information on the operation, and transmits, by using a second address of an outdoor unit to be controlled or an indoor unit to be controlled belonging to the same control network, the control command to the outdoor unit to be controlled or an outdoor unit connected with the indoor unit to be controlled, and
when the control command is addressed to the indoor unit to be controlled, the outdoor unit connected with the indoor unit to be controlled transmits the control command to the indoor unit to be controlled by using a first address of the indoor unit to be controlled.

6. The air conditioning system according to claim 4, wherein
the outdoor units and the extended control device determine a class of the second address by using one or more of the number of the extended control devices, the number of the outdoor units, and the number of indoor units connected with the outdoor units.

7. A communication method for an air conditioning system comprising:
a plurality of outdoor units;

a plurality of indoor units, each communicating with any one of the outdoor units by a first communication method; and a central control device communicating with each of the outdoor units by a second communication method and controlling the outdoor units and the indoor units, the communication method comprising:

a first step of the one of the outdoor units generating, by using a first address assigned to the one of the outdoor units, a second address of the one of the outdoor units, and generating, by using a first address assigned to one or more indoor units connected with the one of the outdoor units among the indoor units, a second address of the one or more indoor units, the first address being used for communication performed using the first communication method and the second address being used for communication performed using the second communication method;

a second step of the one of the outdoor units, obtaining, from another of the outdoor units, a second address generated by the another of the outdoor units, obtaining, from the central control device, a second address of the central control device, checking whether or not there is a duplicate address between the second addresses generated and the second addresses obtained, and, if there is a duplicate address, providing information indicating that there is a duplicate address; and a third step of the central control device obtaining, from each of the outdoor units, the second addresses of a corresponding one of the outdoor units and each of the indoor units generated by the corresponding one of the outdoor units, and controlling an operation of the outdoor units and the indoor units by using the second addresses.

8. The air conditioning system according to claim 2, wherein the outdoor units determine a class of the second address by using one or more of the number of the outdoor units and the number of indoor units connected with the outdoor units.

9. The air conditioning system according to claim 2, comprising:

at least one extended control device communicating with the central control device and the outdoor units by the second communication method and controlling an outdoor unit and an indoor unit belonging to a same control network, wherein the outdoor units and the extended control device generate a second address including identification information on the control network.

10. The air conditioning system according to claim 9, wherein the central control device transmits information on an operation received from a user to the extended control device by using a second address of the extended control device, the extended control device generates a control command on a basis of the information on the operation, and transmits, by using a second address of an outdoor unit to be controlled or an indoor unit to be controlled belonging to the same control network, the control command to the outdoor unit to be controlled or an outdoor unit connected with the indoor unit to be controlled, and when the control command is addressed to the indoor unit to be controlled, the outdoor unit connected with the indoor unit to be controlled transmits the control command to the indoor unit to be controlled by using a first address of the indoor unit to be controlled.

11. The air conditioning system according to claim 9, wherein the outdoor units and the extended control device determine a class of the second address by using one or more of the number of the extended control devices, the number of the outdoor units, and the number of indoor units connected with the outdoor units.

12. The air conditioning system according to claim 5, wherein the outdoor units and the extended control device determine a class of the second address by using one or more of the number of the extended control devices, the number of the outdoor units, and the number of indoor units connected with the outdoor units.

13. The air conditioning system according to claim 10, wherein the outdoor units and the extended control device determine a class of the second address by using one or more of the number of the extended control devices, the number of the outdoor units, and the number of indoor units connected with the outdoor units.

* * * * *